Dec. 1, 1925.　　　　　　　　　　　　　　　　　　1,563,325
F. BIELASKI
SAW TABLE GUIDE
Filed April 20, 1925

INVENTOR
Frank Bielaski
BY
　　ATTORNEY

Patented Dec. 1, 1925.

1,563,325

UNITED STATES PATENT OFFICE.

FRANK BIELASKI, OF DETROIT, MICHIGAN.

SAW-TABLE GUIDE.

Application filed April 20, 1925. Serial No. 24,561.

*To all whom it may concern:*

Be it known that I, FRANK BIELASKI, a citizen of the United States, and residing at Detroit, in the county of Wayne and State of Michigan, have invented a new and Improved Saw-Table Guide, of which the following is a specification.

The present invention relates to guides for saw tables and particularly to guides for "ripsaws" for cutting strips of uniformly predetermined width.

Heretofore, on such tables, guides have been used and it is usual to make the guide a single strip movable laterally over a scale so that it may be set for the proper width. Such an arrangement necessitates a new setting for each width desired. If a number of strips of different widths are to be cut, the greater part of the time of the operation will be taken up in setting the guide.

Among the objects of the present invention, therefore, is a guide which may be set once for a number of different widths and the individual settings accomplished in a minimum of time.

Another object is a guide which is instantaneously available, but which can be quickly moved out of the way if the table is desired free from obstruction.

With these and other objects in view as will readily occur to those skilled in the art, the invention consists broadly in a rack containing a number of guides adapted to be set in the saw table and so constructed and arranged that any guide may be quickly raised to and supported in operative position and as quickly gotten out of the way when another width is desired.

The invention will be more readily described and understood by referring to the accompanying claims, in which:—

Figure 1:
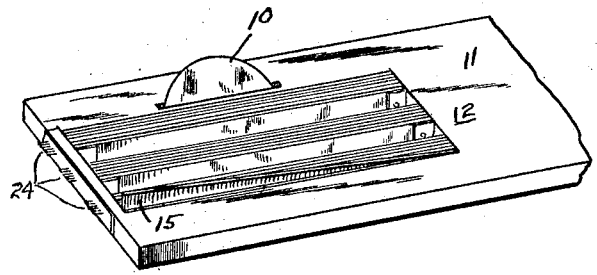
Fig. 1 is a perspective drawing of the device installed in a saw table.

In the drawings in Fig. 1 there is shown a ripsaw 10 with its table 11 and showing the guide, indicated as a whole by the numeral 12, mounted in said table with its upper surface flush with the upper surface of the table. This figure also shows the guide with one of the guide bars 15 in upper or operative position.

Figure 2:
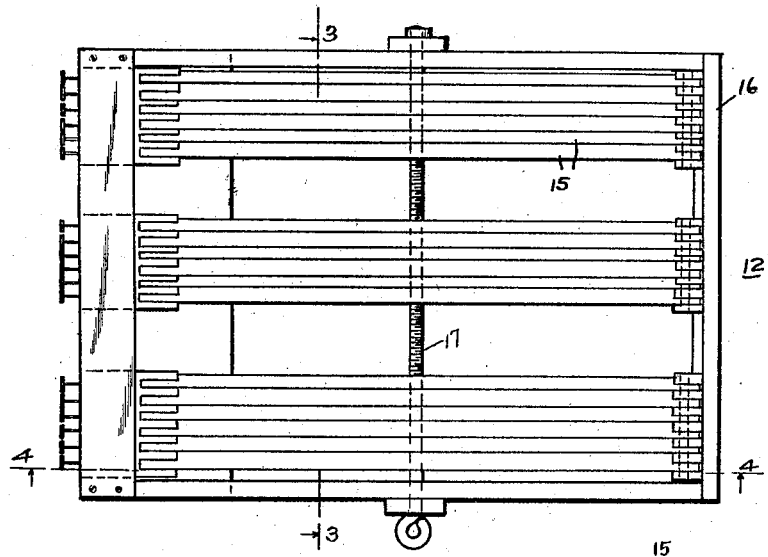
Fig. 2 is a plan view of the device.
Figure 3:
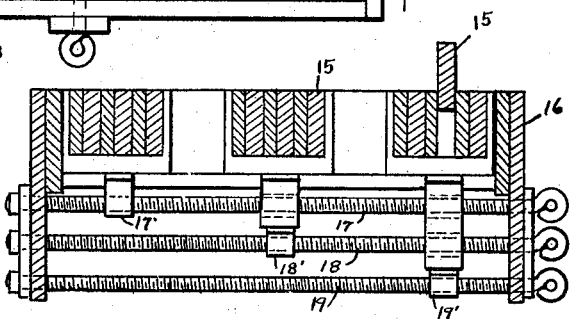
Fig. 3 is a cross section through the device of Fig. 2 on line 3—3.

The guide itself is shown in the other figures and consists of a rack 16 in which is mounted a plurality of guide bars 15 which are preferably grouped as indicated in Figs. 2 and 3. Guide bars 15 are hinged at one end in the rack 16 and are so mounted that normally their upper edges are flush with the upper edge of the rack and the whole when mounted in the table flush with the surface of the table. Each group of bars will be movable laterally in the rack as a unit by means of threaded rods 17, 18 and 19. These rods will extend from one side of the rack and will be threaded in corresponding nuts 17′, 18′ and 19′, secured to the subframe for each group as shown clearly in Fig. 3. By operating any one of the rods 17, 18 and 19 the corresponding group of guide bars may be moved laterally in the rack.

Figure 4:
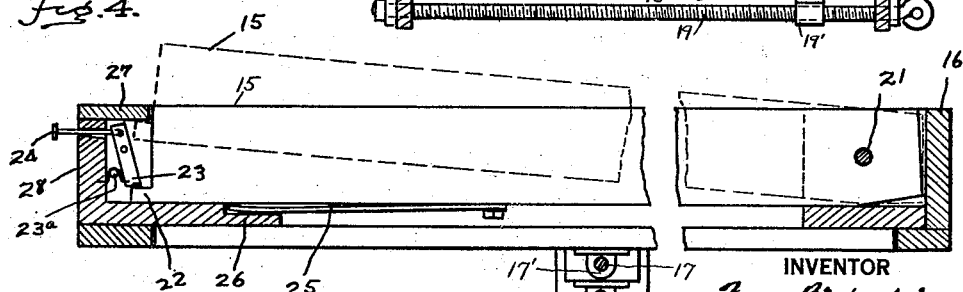
Fig. 4 is longitudinal section on line 4—4 of Fig. 2.

Each guide bar 15 will, as stated above, be hinged in one end of the rack as shown at 21 in Fig. 4. The other end of the guide bar 15 will be provided with a short extension 22 against which a catch 23, spring pressed as at 23ª, operates to hold the bar in its lower and flush position. This spring catch 23 will be releasable by means of a push button 24 so that the bar may be lifted to the position shown in dotted lines in Fig. 4. When the spring catch 23 is released the bar will be lifted by means of a flat spring 25 secured to its bottom edge and operating against a fixed abutment 26 and the upward movement of the bar 15 will be limited by the extension 22 coming against a horizontal portion 27 of the rack 16.

It will of course be understood that the fixed abutment 26, the end 28 through which the push button 24 extends and the hinge 21 will form a part of the frame for each group which frame will be slidable as a unit laterally in the rack 16.

In the practical construction of the device the bars 15 may be of any suitable material preferably metal and one or several groups of bars may be used. These bars may be of the same thickness or they may be of different dimensions laterally so that work of odd sizes may be taken care of. In case a number of strips of different widths are required to be sawed in quick succession, the groups may be set so that selected bars will provide for the widths required. It is then only necessary to release the required bar by pushing the button and when the next width is required to push that particular bar down and release the next one.

It should be understood that the invention is not to be limited to the specific embodiment described and illustrated as this may be varied without departing from the scope of the claims which follow.

Claims—

1. In combination with a saw and table therefor, a guide bar mounted in said table and hinged at one end, a spring adapted to lift said bar about said hinge, means for retaining said bar in lowered position, means for releasing said retaining means, and a stop for limiting the upward movement of the bar.

2. In combination with a saw and table therefor, a rack, a plurality of groups of guide bars mounted in said rack with their upper edges flush with the surface of said table, means whereby any one of said bars may be raised for use as a guide for work and means for moving said groups laterally.

3. A work guide for saws including a rack, a guide bar hinged at one end in said rack, a spring adapted to lift said bar about said hinge, means for retaining said bar in lowered position, means for releasing said retaining means and a stop for limiting the upward movement of the bar.

4. A work guide for saws including a rack, a group of guide bars mounted in said rack, means for lifting any one of said bars to guiding position and means for moving said group of bars laterally.

FRANK BIELASKI.